June 7, 1927.
L. D. SOUBIER
1,631,230
GLASS FEEDER
Filed March 26, 1924     2 Sheets-Sheet 1
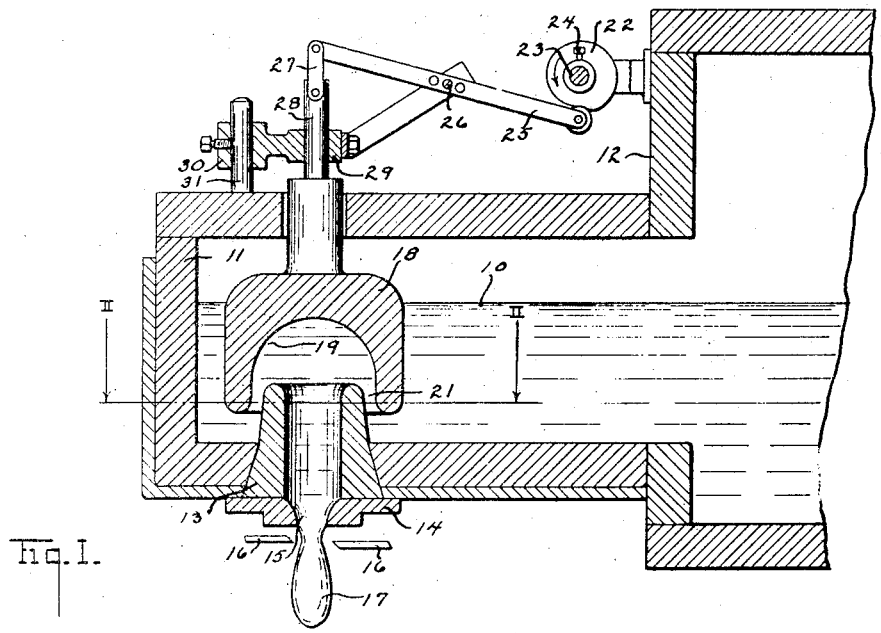
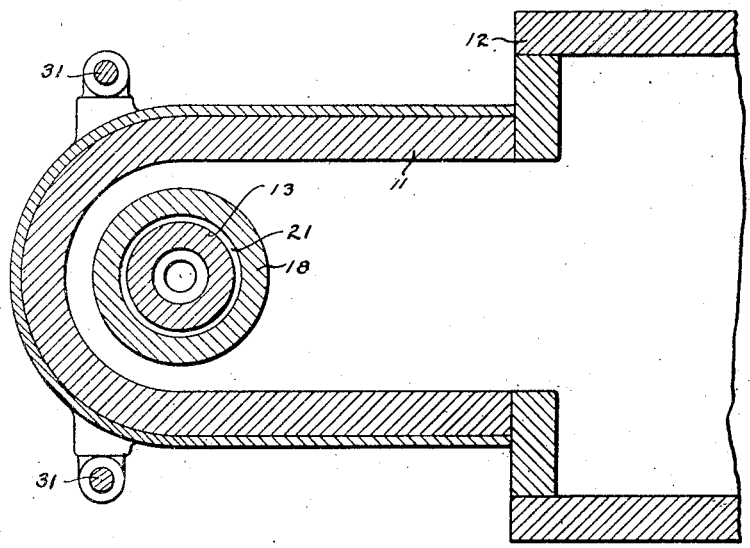
INVENTOR.
Leonard D. Soubier,
By J. F. Rule.
His attorney.

June 7, 1927. 1,631,230
L. D. SOUBIER
GLASS FEEDER
Filed March 26, 1924 2 Sheets-Sheet 2
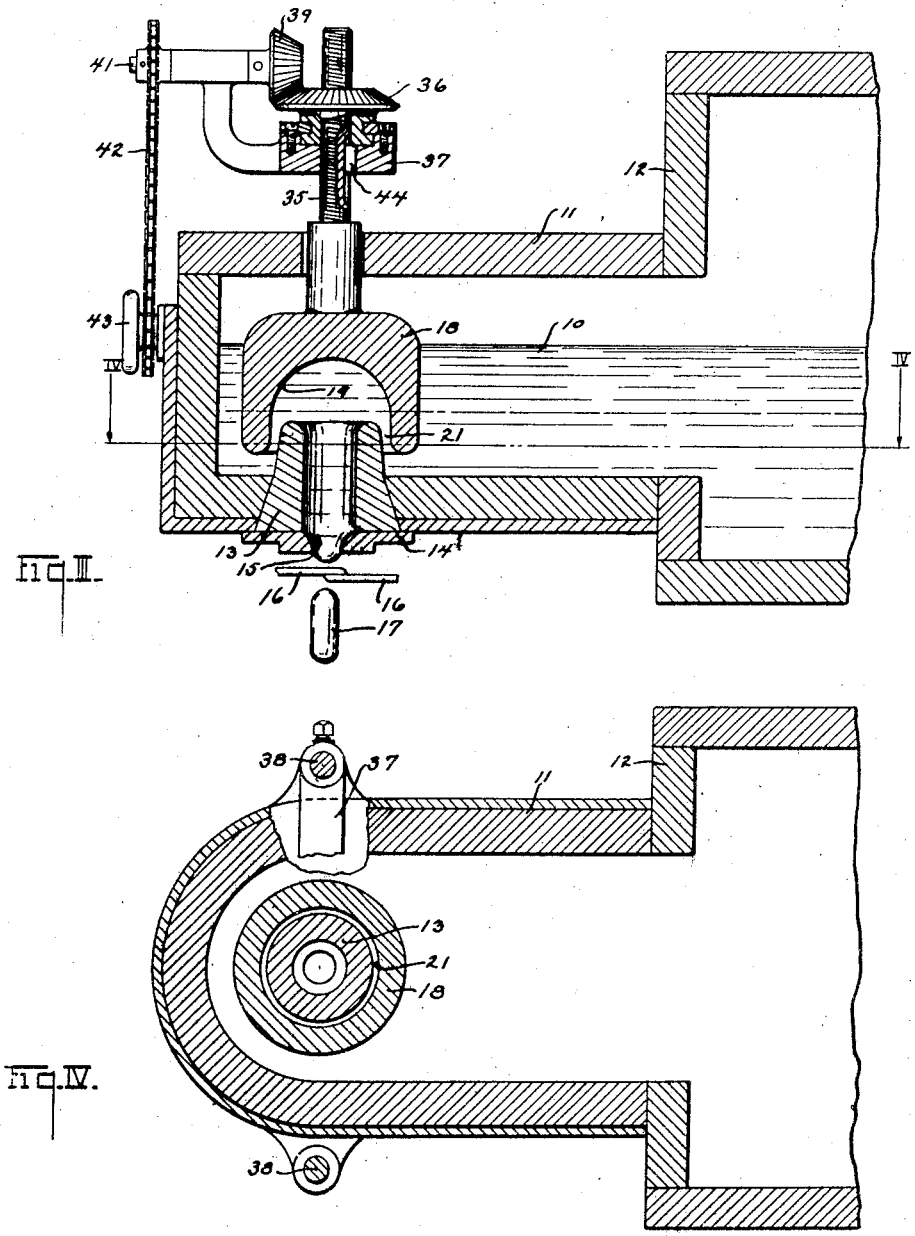
INVENTOR.
Leonard D. Soubier
By J. F. Rule
His attorney.

Patented June 7, 1927.

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed March 26, 1924. Serial No. 701,887.

My invention relates to apparatus for forming and delivering charges of molten glass. At the present day, glass feeders ordinarily comprise a container having an outlet opening in the bottom thereof through which the molten glass issues, the discharge of glass being controlled by a plug or regulator which is periodically reciprocated vertically in the glass over the outlet.

An object of the present invention is to provide an improved form of this general type of feeder, wherein the reciprocating regulator is adapted to much more effectively control the issuance of the glass, than with the usual reciprocating plug, and also with a much smaller movement of the regulator. For this purpose, the regulator is preferably in the form of an inverted cup or bell of larger diameter than the outlet, thereby providing a capacity device or chamber by which a certain amount of glass is segregated from the surrounding body of glass and so confined that the movement of the glass through the outlet is effectively controlled. The container is preferably provided with an annular wall surrounding the outlet orifice and extending upward within the container and providing a well or enlarged passageway through which the glass flows in its passage from the container to the outlet orifice. This well is shaped to cooperate with the reciprocating regulating bell for effectively controlling the issuing glass.

Other features of the invention will appear hereinafter.

In the accompanying drawings:

Figure 1 is a sectional elevation of an apparatus constructed in accordance with my invention.

Figure 2 is a sectional plan substantially at the plane of the line II—II on Figure 1.

Figure 3 is a sectional elevation of a modified construction in which the regulator is normally stationary, but adjustable up and down.

Figure 4 is a section substantially at the plane of the line IV—IV on Figure 3.

Molten glass 10 is continuously supplied to the container 11, which may be the usual boot extension of a refining tank or furnace 12. Mounted in the floor of the boot is a substantially cylindrical member 13, projecting upward above the floor of the boot into the glass and having an upwardly tapered outer surface. A clay bushing 14 at the bottom of the member 13 provides an outlet opening 15 through which the glass issues from the well or passageway formed by the member 13. Cutters 16 operate periodically in the usual manner to sever the suspended charges or gobs of glass 17.

The flow of glass is controlled by a regulator 18 extending downward into the glass over the member 13. This regulator is preferably in the form of an inverted cup or bell providing a capacity chamber 19 in which is confined a measured quantity of glass above the well. The walls of the regulator 18 extend downward below the upper end of the member 13 and surround the latter, being spaced therefrom to provide an annular restricted passageway 21 through which the glass enters the chamber 19. The member 13 projecting upward into the capacity chamber 19 constitutes a displacement device by which a variable amount of glass is displaced from the chamber 19, depending on the position of the regulator 18.

In the form of my invention shown in Figures 1 and 2, the regulator 18 is periodically reciprocated vertically by means of a cam 22 mounted on a continuously rotating drive shaft 23. The cam is preferably rotatively adjustable on the shaft for adjusting the timing of the regulator relative to the shears 16, which are operated in timed relation to the movements of the regulator. The cam is held in adjusted position by a set screw 24. The cam operates through a lever 25, fulcrumed at 26 on a stationary bracket, and connected through a link 27 to the stem 28 of the regulator. The said stem works in a stationary bearing sleeve 29 on a yoke 30 which may be adjustably mounted on standards 31.

Glass from the supply body of molten glass in the container 11 enters and fills the chamber 19 and the well 13 and issues through the orifice 15. When the regulator moves downward, it exerts an expelling force on the issuing glass and causes a rather rapid extrusion of the glass. Owing to the comparatively large diameter or capacity of the chamber 19 and the considerable displacement of glass by the member 13, a small movement of the regulator downward causes a comparatively large amount of glass to be forced through the outlet. On account of the annular passageway 21 being quite restricted, and the decrease in its area as the regulator moves downward; the downward force applied to the regulator will operate mainly on the issuing glass and not be dissipated to the surrounding glass. Also on account of the upward taper of the member 13, this restriction of the annular passageway 21 is increased as the regulator moves downward, so that the expulsive action of the regulator on the issuing glass becomes increasingly effective and positive. Also, when the regulator moves upward, it will have a powerful retractive upward pull on the glass within the well and the glass suspended from the outlet, a small upward movement of the regulator being sufficient to effect a considerable retraction of the glass at the outlet. The regulator also is effective in controlling the glass and preventing downward movement of glass through the outlet to any extent during the periods that the regulator remains stationary, particularly when in its downward position. Sometimes it is desirable to operate the feeder without reciprocating the regulator 18, particularly when the gobs or charges of glass are to be delivered in comparatively rapid succession. In this case, the drive shaft 23 may remain stationary. The height of the regulator may also be adjusted by rotatively adjusting the cam 22 on the stationary drive shaft.

Figures 3 and 4 illustrate a modification for manually adjusting the regulator 18 up and down to regulate the flow of glass. In this construction, the regulator is provided with a screw threaded stem 35 on which is mounted a bevel gear 36, the latter being internally threaded to receive the stem 35, so that the latter is adjusted up or down when the gear is rotated. The gear 36 is rotatively mounted in a bracket or yoke 37, supported on vertical standards 38. A pinion 39 running in mesh with the gear 36 is mounted on a shaft 41 having a sprocket wheel and chain connection 42 with an adjusting hand wheel 43. By rotating the hand wheel, the gear 36 is rotated, thereby causing a vertical adjustment of the stem 35 and regulator 18, the latter being prevented from rotating by means of a key 44.

When the regulator is adjusted downwardly, the flow of glass through the passageway 21 is throttled or restricted to a greater extent, thereby reducing the rate of flow and diminishing the size of the gobs 17. Conversely, by adjusting the regulator upward, the rate of flow and size of the charge are increased. The weight of the charge is thus readily controlled. This provides a ready means of adjustment to compensate for any variations due to changes in the temperature and fluidity of the glass, or other varying conditions met with in practice, so that the operator may maintain the charges at a substantially constant weight. The adjustment also permits the size of the charges to be regulated to correspond to the size of any particular molds which may be in use with the feeder.

Modifications of the structures herein shown, may be resorted to within the spirit and scope of my invention.

What I claim is:

1. Apparatus for delivering charges of molten glass comprising, in combination, a container for the glass provided with a passageway through which the glass is discharged, a controlling member extending into the glass adjacent the entrance to said passageway, said member being of substantially larger diameter than that of the passageway and formed to provide a capacity chamber containing glass to be discharged, said chamber communicating with the main body of glass in the container through a restricted passageway, a displacement device extending into said chamber, and means to cause a periodic relative movement of said member and displacement device whereby the capacity of said chamber is periodically reduced and glass discharged therefrom.

2. Apparatus for delivering charges of molten glass comprising, in combination, a container for the glass provided with a passageway through which the glass is discharged, a controlling member extending into the glass adjacent the entrance to said passageway, said member being of substantially larger diameter than that of the passageway and formed to provide a capacity chamber containing glass to be discharged, said chamber communicating with the main body of glass in the container through a restricted passageway, automatic means for periodically moving said regulator toward and from the first mentioned passageway, and a stationary displacement device projecting into said chamber an extent variable periodically with the movements of said regulator.

3. Apparatus for delivering charges of molten glass comprising, in combination, a container for the glass provided with a passageway through which the glass is discharged, a controlling member extending into the glass adjacent the entrance to said passageway, said member being of substantially larger diameter than that of the passageway and formed to provide a capacity chamber containing glass to be discharged, said chamber communicating with the main body of glass in the container through a restricted passageway, means for imparting a periodically varying movement to said regulator by which periodic expelling and retarding impulses are applied to the glass in said first mentioned passageway, and a stationary displacement device projecting into said chamber an extent variable periodically with the movements of said regulator.

4. The combination of a container for molten glass having an outlet opening through which the glass is discharged, a regulating device comprising a bell immersed in the glass and facing said outlet, said bell being of substantially larger diameter than the outlet, and a displacement device projecting upward from the floor of the container into said bell.

5. The combination of a container for molten glass having an outlet opening through which the glass is discharged, a regulating device comprising a bell immersed in the glass and facing said outlet, said bell being of substantially larger diameter than the outlet, automatic means for periodically reciprocating the bell toward and from the outlet, and a displacement device projecting upward from the floor of the container into said bell.

6. The combination of a container for molten glass, a cylindrical member extending upward from the floor of the container, and providing an open passageway for the discharge of glass, a regulator positioned in the glass above said member, said regulator providing a capacity chamber to receive glass and having an annular extension or wall projecting downward and surrounding said member and spaced therefrom to provide a restricted annular passageway by which the glass enters said member, and means to cause a periodic relative movement of said regulator and said member whereby the capacity of said chamber is periodically varied and the discharge of glass through the outlet controlled.

7. The combination of a container for molten glass, a cylindrical member extending upward from the floor of the container, and providing an open passageway for the discharge of glass, a regulator positioned in the glass above said member, said regulator having an annular extension or wall projecting downward and surrounding said member and spaced therefrom to provide a restricted annular passageway by which the glass enters said member, and automatic means for periodically moving said regulator up and down.

8. The combination of a container for molten glass, a cylindrical member extending upward from the floor of the container, and providing an open passageway for the discharge of glass, a regulator positioned in the glass above said member, said regulator having an annular extension or wall projecting downward and surrounding said member and spaced therefrom to provide a restricted annular passageway by which the glass enters said member, automatic means for periodically moving said regulator up and down, and means for adjusting the regulator vertically to vary the restriction of said annular passageway.

9. The method of producing formed charges of molten glass which consists in causing glass to issue from a supply body of glass through an outlet, confining a portion of the supply body of glass in an enclosure above the outlet, the glass within the enclosure being connected with that portion of the supply body of glass outside the enclosure by a restricted passageway, maintaining said enclosure continuously filled with glass, and causing periodic downward movements of said enclosure and simultaneous contraction of the space within said enclosure alternating with upward movement of the enclosure and simultaneous expansion of the space within said enclosure, thereby imparting periodic expelling and retractive forces to the issuing glass.

10. The combination of a container for molten glass having a bottom outlet, a member extending upward from the floor of the container and providing a passageway to the outlet for discharge of glass therethrough, a regulating bell projecting downward into the glass over said member and having its rim surrounding said member to thereby form an annular passageway by which glass enters the bell, means for moving said bell up and down to cause a periodic expulsion of glass through the outlet, adjacent faces of the cylindrical member and bell being so shaped that with downward movement of the bell the area of the inlet end of the passageway is decreased to retard movement of glass in the passageway and increase downward pressure on and movement of the glass being discharged.

11. The combination of a container for molten glass having an outlet opening through which glass is discharged, a member extending upward from the floor of the container and surrounding said outlet, the outer surface of said member being tapered upwardly, a regulating device comprising a bell providing a capacity chamber to receive glass and having an annular extension projecting downwardly and surrounding and spaced from said member to provide an annular passageway whose area decreases downwardly and through which glass enters said chamber, means for moving said regulator up and down to periodically expel glass through the outlet, downward movement of the regulator causing a gradual decrease in the area of the inlet to the passageway to retard movement of glass in the passageway, and simultaneously cause a progressive increase in the pressure upon the discharging column of glass.

Signed at Toledo, in the county of Lucas and State of Ohio, this 24th day of March, 1924.

LEONARD D. SOUBIER.